United States Patent Office 2,946,304
Patented July 26, 1960

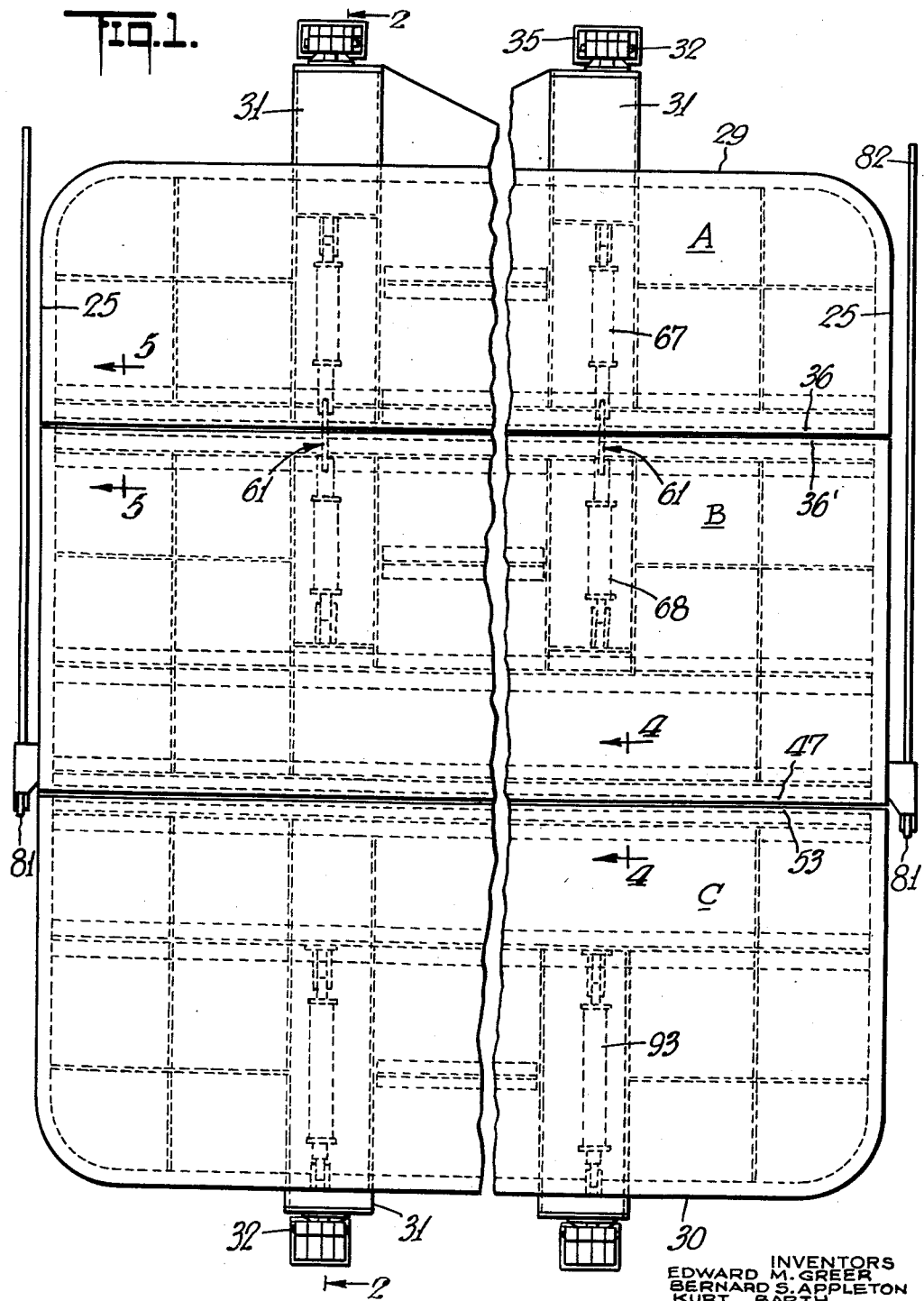

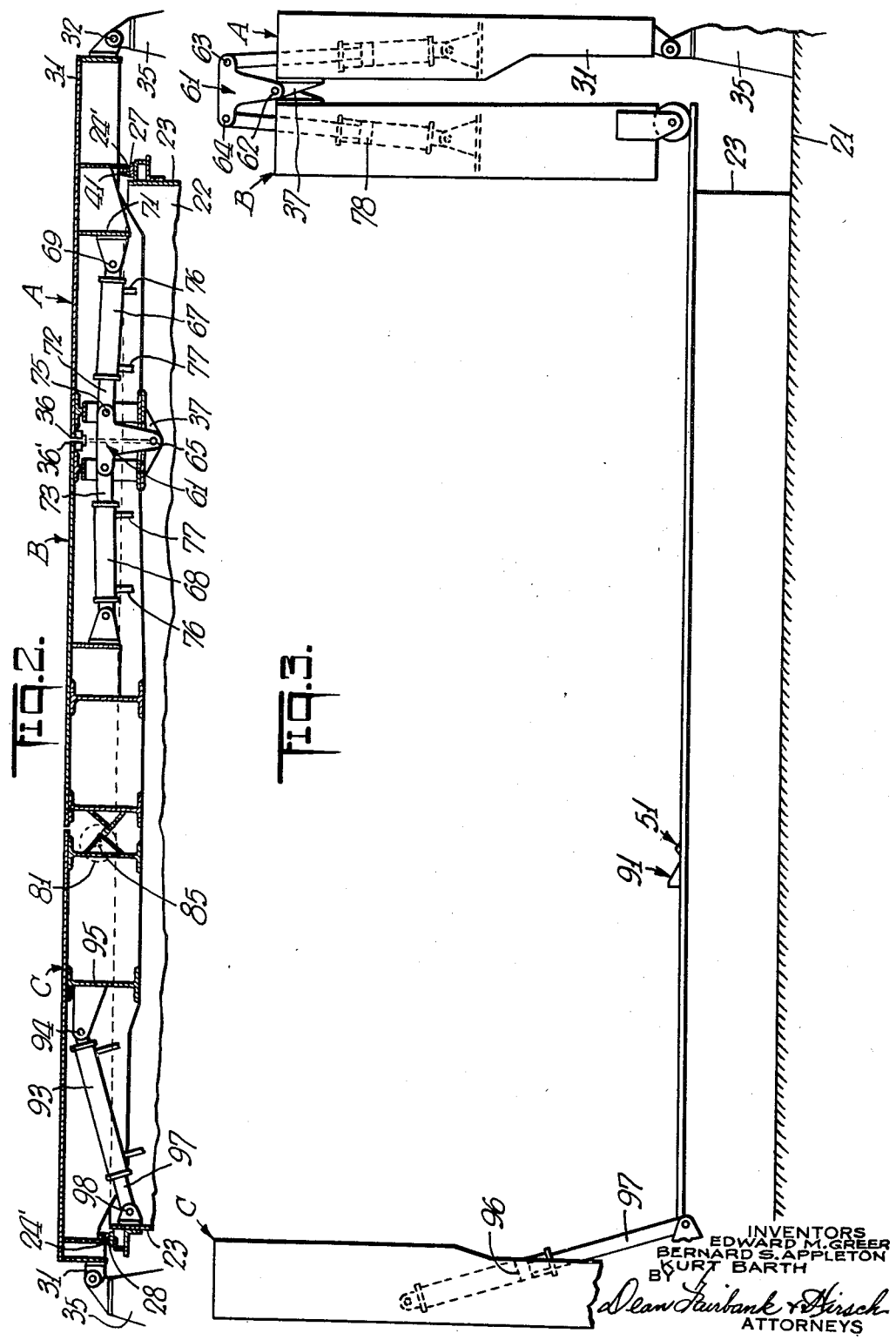

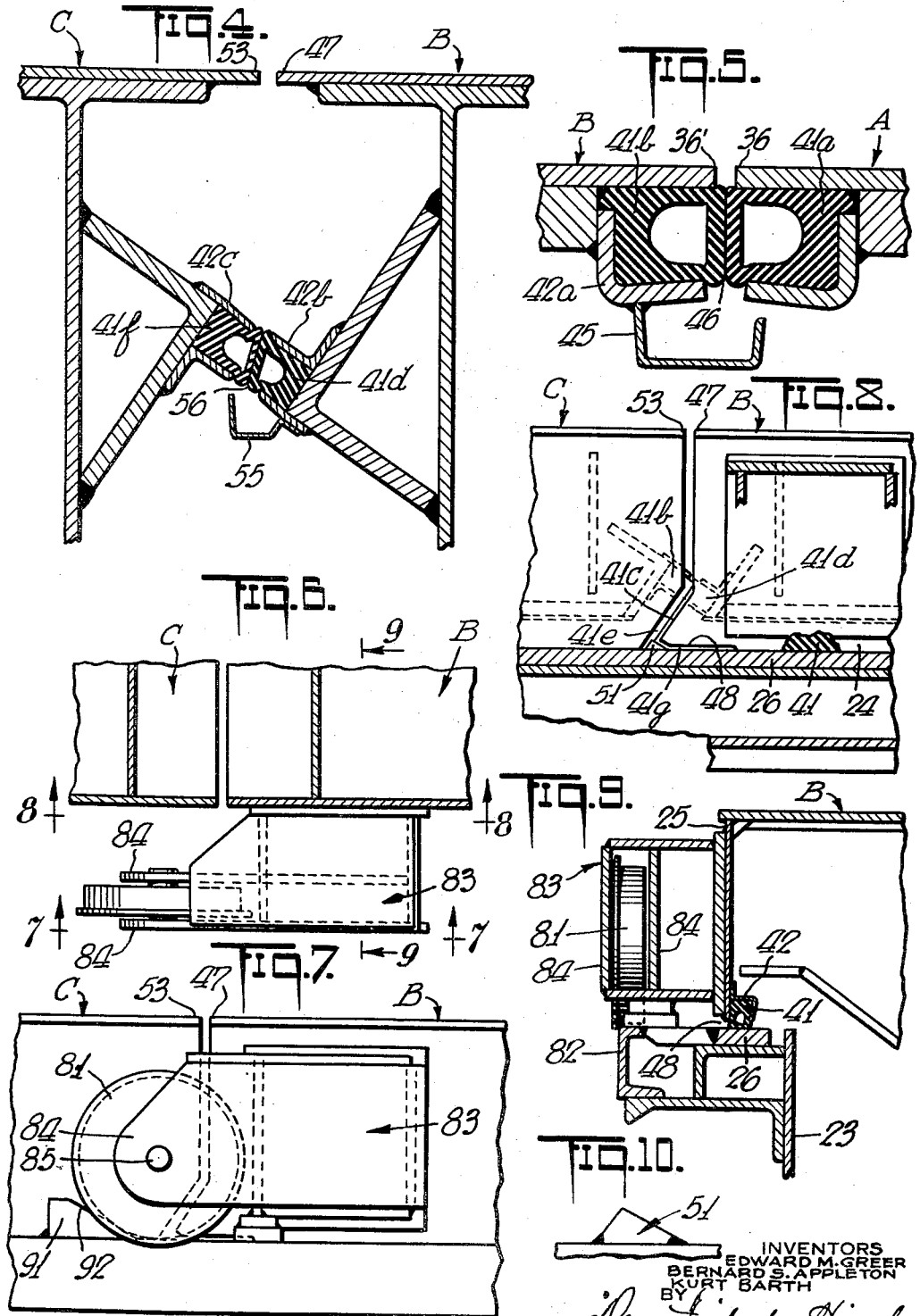

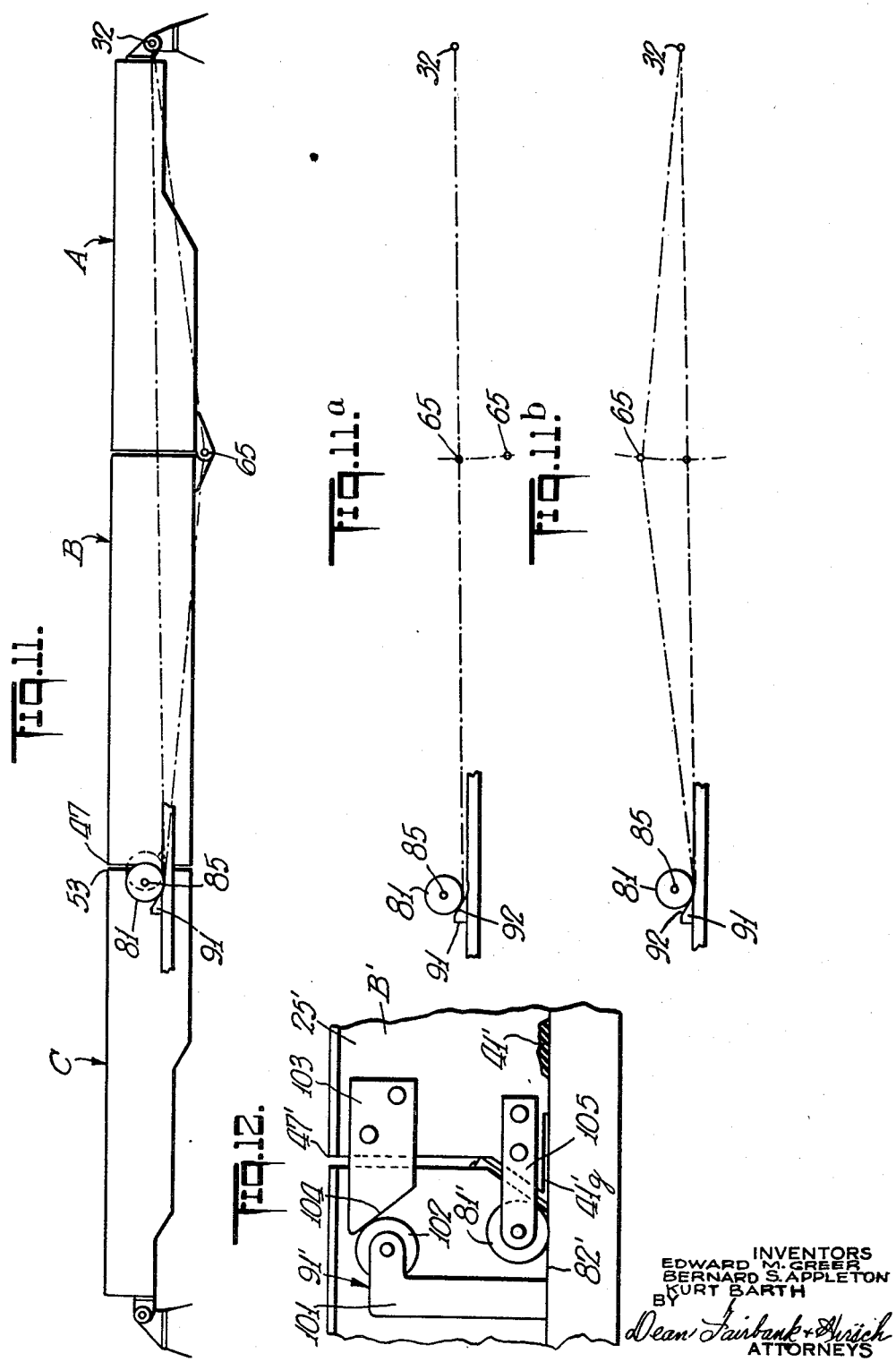

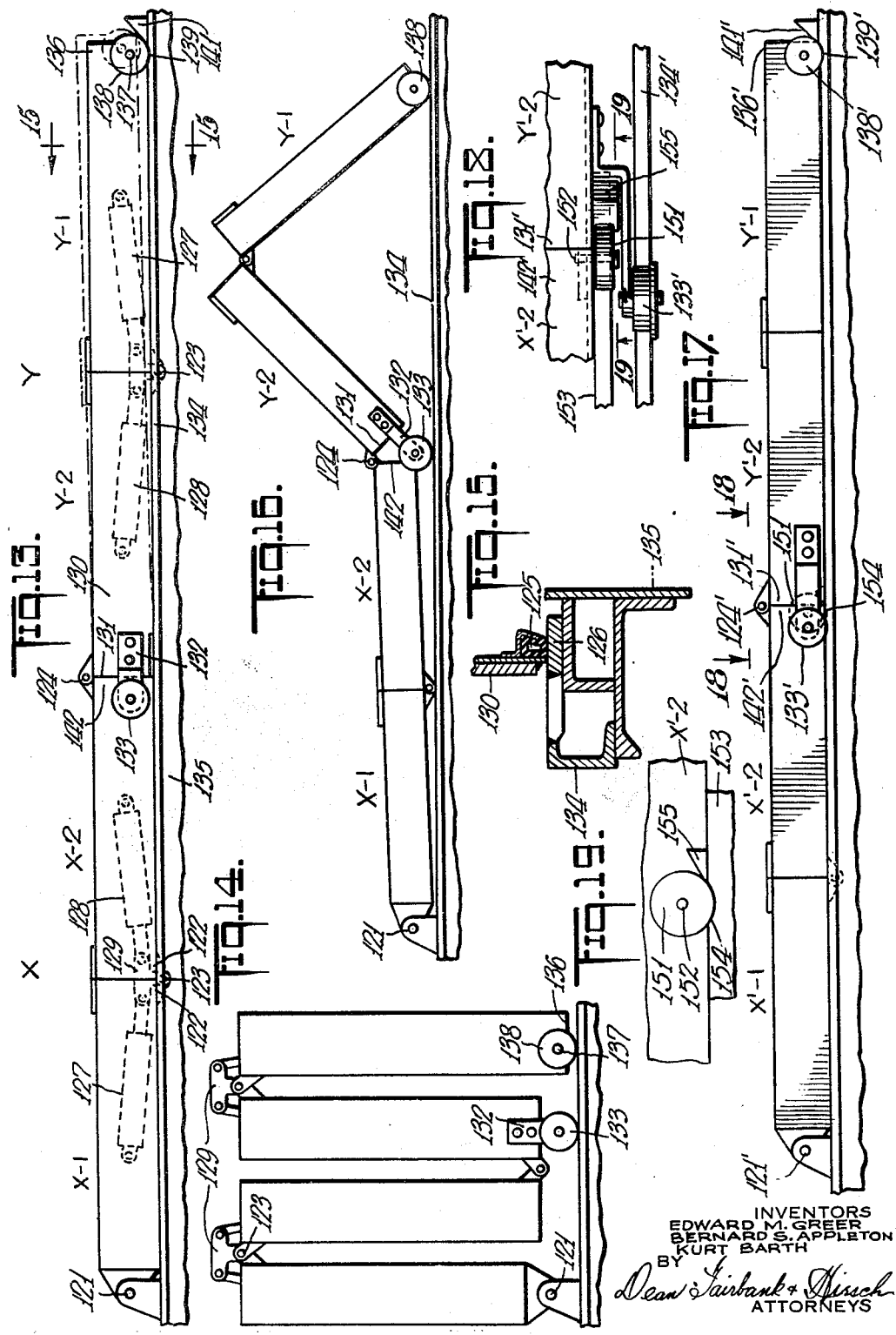

2,946,304
HATCH COVER ASSEMBLY

Edward M. Greer, Great Neck, Bernard S. Appleton, Long Beach, and Kurt Barth, Forest Hills, N.Y., assignors, by mesne assignments, to G.M.E. Corporation, a corporation of New York Filed Mar. 12, 1956, Ser. No. 570,999

20 Claims. (Cl. 114—202)

This invention relates to the art of hatch covers and more particularly to the means for preventing injury to the watertight seal of the hatch cover upon opening and closing thereof.

Where a hatchway is closed by means of a plurality of pivotally connected panels provided with resilient seals or gaskets which engage a sealing rail around the hatchway to insure watertight security, if, when the panels are moved from closed to open position or vice versa, excessive rubbing occurs of the resilient gasket against the sealing rail, the resultant friction will cause breakdown of the gasket, thereby permitting leakage of water into the hatchway at the point of friction.

Where, to prevent such rubbing of the gasket against the sealing rail during opening and closing of the hatchway, movable actuators are provided in addition to the means normally required to effect such opening and closing, the cost of the hatch cover assembly is increased as is the cost of maintenance thereof.

It is accordingly among the objects of the invention to provide a hatch cover assembly that is relatively simple in construction, having but few parts that are not likely to become out of order, that provides watertight security when the hatch covers are in closed position, and may readily be automatically operated by even unskilled personnel to open and close the hatchway in a minimum of time and with substantially no manual operations, other than the operation of a valve or pushing of a button, with assurance that during the opening and closing operations no injury will be imparted to any portion of the resilient gasket affecting such watertight security and which does not require the use of power in addition to that normally required to effect movement of the hatch covers to open and closed position, or the use of movable actuators in addition to the means normally required for such movement.

In an illustrative embodiment of the invention, the hatchway of a ship is closed by means of a cover assembly comprising at least a pair of substantially rectangular panels which are hinged together and which extend across the hatchway, said assembly being hinged to one end of the hatchway on a support affixed with respect thereto. The panels, when in closed position, are in substantially the same horizontal plane, with the end edges of the panels resting on supporting members rigidly fixed with respect to the sides of the hatchway and the panels are designed to be folded together about their common hinge connection for movement to open position.

To provide watertight security between the panels and the hatchway, the panels are provided with resilient seals or gaskets which rest on an associated sealing rail when they are in closed position and to prevent injury to the gaskets, according to the invention, means are provided, controlled by the movement of the panels, to move the gaskets carried thereby away from the sealing rail and to retain such gaskets out of engagement with the sealing rail throughout the entire opening operation as well as throughout the entire closing operation until the panels have reached fully closed position.

More particularly, an abutment member is mounted on each side of the hatchway and has an inclined surface in the path of movement of an associated roller mounted on the ends of the panel remote from the hinge mount of the cover assembly at the end of the hatchway and movable along tracks also positioned on each side of the hatchway. The axis of the hinged mount of the cover assembly, as well as the axis of the common hinge connection between the pair of panels and the portions of said tracks on which said rollers rest when the panels are closed are so positioned that when initial opening movement is effected of the pair of panels, the panel mounting said rollers will move away from the hinge mount of the cover assembly at the end of the hatchway, causing said rollers to ride up said abutment thereby to move the portion of the gasket adjacent the rollers away from the sealing rail to break the seal. Similarly, when the panels are moved from open position to closed position, as such panels approach the closed position, the rollers will first ride up the abutment before the panels reach the final closed position and will ride down such abutment when the panels are in closed substantially horizontal position and only at such time will the resilient gasket press tightly against the sealing rail to provide the desired sealing action.

In the accompanying drawings in which are shown one or more of various possible embodiments of the several features of the invention, Fig. 1 is a plan view of one embodiment of the invention, Fig. 2 is a sectional view taken along line 2—2 of Fig. 1, Fig. 3 is a side elevational view showing the hatch cover in open position, Fig. 4 is a detailed sectional view on an enlarged scale taken along line 4—4 of Fig. 1.

Fig. 5 is a view similar to Fig. 4 taken along line 5—5 of Fig. 1,

Fig. 6 is a fragmentary plan view showing the panel supporting rollers,

Fig. 7 is a side elevational view taken along line 7—7 of Fig. 6,

Fig. 8 is a view similar to Fig. 7 taken along line 8—8 of Fig. 6,

Fig. 9 is a sectional view taken along line 9—9 of Fig. 6,

Fig. 10 is a detail view on a larger scale of the sealing abutment,

Figs. 11, 11a and 11b are diagrammatic views illustrating the operation of the embodiment shown in Figs. 1 to 10, Fig. 12 is a fragmentary view of another embodiment, Fig. 13 is a side elevational view of still another embodiment with the panels in closed position, Fig. 14 is a view similar to Fig. 13 with panels in open position, Fig. 15 is a sectional view taken along line 15—15 of Fig. 13, Fig. 16 is a side elevational view similar to Fig. 13 showing the panels in partially open position, Fig. 17 is a side elevational view of another embodiment of the invention, Fig. 18 is a top plan view taken along line 18—18 of Fig. 17, and Fig. 19 is a fragmentary detail view on an enlarged scale taken along line 19—19 of Fig. 18.

Referring now to the drawings, in the illustrative embodiment shown in Figs. 1 to 3, for example, the deck 21 of the ship has a conventional hatchway 22 having a substantially rectangular coaming 23 rising therefrom which serves to support a hatch cover assembly in the manner to be described so that a watertight seal will be effected.

The hatch cover assembly illustratively comprises a pair of substantially rectangular panels A and B, as well as an additional substantially rectangular panel C. The panels are of sufficient length so that they may extend transversely across the hatchway with the lower edges 24 (Fig. 8) of the ends 25 (Fig. 1) of each panel resting on rails 26 extending along each side of the hatchway and positioned outwardly of the coaming 23 as shown in Fig. 9.

In addition, as shown in Fig. 2, rails 27, 28 extend transversely across the hatchway at each end thereof, also positioned outwardly of the coaming 23 to support the lower edges 24' of the outer edges 29, 30 respectively of the panels A and C (Figs. 1 and 2).

As shown in Figs. 1 and 2, the outer edges 29, 30 of each of the panels A and C mounts a plurality of arms 31 which extend outwardly therefrom. The free end of each of the arms 31 is pivotally connected as at 32 to the top of an associated upright standard 35 affixed to the deck of the ship adjacent the respective ends of the hatchway. The adjacent inner edges 36, 36' of the panels A and B at their lower edges are connected as by means of common hinge 37 (Figs. 1 and 2) so that the pair of panels A, B may be folded about such hinge 37 from the closed position shown in Fig. 2 to the open position shown in Fig. 3.

In order to prevent leakage of water into the hatchway, a sealing strip or gasket 41, preferably of resilient material, such as rubber, is affixed to the periphery of each of the panels A, B and C by means of a bracket 42 as illustratively shown in Fig. 9.

The portions of the gaskets 41 along the ends 25 of the panels engage the rails 26 as shown in Figs. 8 and 9 and the portions of the gasket 41 positioned along the inner sides of the edges 29 and 30 of the panels A and C engage the transverse rails 27 and 28 as shown in Fig. 2. The portions of the gasket adjacent the inner edges 36, 36' of panels A and B rise substantially vertically from the lower edges 24 of said panels and then extend along such inner edges as at 41a and 41b (Figs. 2 and 5) adjacent the top of the associated panel, the portions 41a and 41b of the gaskets abutting to provide a watertight seal. Desirably the bracket 42a mounting the gasket portion 41b carries a gutter 45 which extends the length of panel B adjacent the junction 46 between gasket portions 41a and 41b to collect any water that may leak past the junction 46.

The portion 41c of gasket 41 adjacent the outer edge 47 of panel B (Figs. 1, 8) rises at an inclination toward the pivotal mount 32 of panel A and then extends along such edge 47 as at 41d (Figs. 4 and 8) supported by a bracket 42b. Desirably, the lower edge 24 of the panel B adjacent edge 47 thereof is cut away as at 48 so that the gasket 41 will protrude below such cut away portion even when the panels are in the closed position as shown in Figs. 8 and 9.

A sealing abutment 51 (Figs. 3, 8 and 10) is affixed to the rail 26 in alignment with the gasket 41 and said abutment desirably has an inclined surface adapted to be engaged by the lower edge of the gasket 41 at its inclined portion 41c when the panels are in closed position.

The portion 41e of gasket 41 of panel C adjacent the inner edge 53 of panel C extends upwardly at an inclination, parallel to the inclined portion 41c as shown in Fig. 8 and then extends along the edge 53 of the panel C below the top of the latter as at 41f, supported by a bracket 42c as shown in Fig. 4. The portions 41d and 41f of gaskets 41 extend past their associated brackets as shown in Fig. 4 so that they will engage when the panels B and C are in closed position to form a dependable seal. As shown in Fig. 4 the portion 41f of gasket 41 of panel C is in a plane above that of the corresponding portion 41d of gasket 41 of panel B and a gutter 55 is affixed to the bracket 42b and extends beneath the junction 56 between portions 41d and 41f of said gaskets 41 to collect any water that may leak past such junction 56.

The portions of the gaskets 41 adjacent the lower edges 24 of the panels, in normal uncompressed condition extend beyond said edges 24. When said edges 24 seat on the rail 26, for example, as shown in Fig. 8, the gasket 41 will be compressed to form a dependable seal against such rail to provide watertight security, yet excessive compression is prevented by reason of the abutment of edge 24 against the rail 26. In addition, the portions 41a, 41b (Fig. 5), 41d, 41f (Fig. 4) of the gaskets 41 extending transversely across the coaming and the portion 41c, 41e (Fig. 8) of the gaskets 41 along the edges 47, 53 of panels B and C will resiliently engage each other when the hatch covers are in closed position to provide a dependable watertight seal.

By reason of the fact that the edges 24 of the panels rest on the rail 26, the force of the waves dashing thereagainst will be broken so that but little pressure will be exerted against the gasket 41 inside the panels to prevent injury to such gaskets by reason of the impact of such waves.

Although the panels A, B and C may be moved in any suitable manner from the closed position shown in Fig. 2 in which they lie in side by side relationship in a horizontal plane, to the open position shown in Fig. 3 in which they extend parallel to each other in a vertical plane, in the illustrative embodiment shown, hydraulic means are preferably employed which, in the case of the panels A and B may be of the type shown in Patent No. 2,491,261, dated December 13, 1949.

To this end, referring to Figs. 1, 2 and 3, a reaction member, preferably a plate 61 is provided which may be substantially triangular in shape and has an opening 62, 63 and 64 (Fig. 3) at each of its corners and is desirably positioned in a vertical plane with a pin 65, which defines the axis of hinge 37, extending freely through the bottom opening 62.

Reacting against each of the plates 61 is a pair of opposed hydraulic units 67, 68 mounted respectively in panels A and B. The rear end of each of the units 67, 68 is preferably pivotally mounted as at 69 to an associated beam 71. The outer ends of the reciprocal plungers 72, 73 of the units 67, 68 respectively are pivotally connected to an associated reaction plate 61 by means of pins 75 extending through the outer end of the plungers and the openings 63 and 64 respectively. The hydraulic units 67, 68 are illustratively of a double acting type and each has control ports 76, 77 at its respective ends on each side of a piston 78 slidably mounted therein.

To facilitate movement of the panels A and B from closed to open position and vice versa, in the manner hereinafter to be described, the panel B at each end 25 adjacent its outer edge 47 mounts a roller 81, illustratively of the flanged type adapted to ride on an associated track 82 positioned outwardly of the rail 26 and extending along the sides of the hatchway (Figs. 1 and 9).

Although the rollers 81 may be mounted in any suitable manner, as shown in Figs. 1, 6, 7 and 9, a bracket 83 is affixed to each end 25 of panel B, each bracket having a pair of spaced arms 84 extending parallel to such end and outwardly spaced therefrom. The arms 84 extend beyond the edge 47 of said panel B and a roller 81 is rotatably mounted therebetween on an axle 85.

The diameter of the rollers is such that when the panels are in the closed position shown, the lower edge 24 of the panels will seat on the rail 26 so that the gaskets 41 will also press against said rail to effect a watertight seal.

As shown in Fig. 2, each of the portions of the tracks 82 engaged by the rollers 81 when the panels are in closed position, is on a plane above the horizontal plane of the hinge connection 65 between the panels A and B. Thus, when the panels are in closed position, as diagrammatically shown in Fig. 11, lines drawn between the hinge 65, the pivot point 32 and the portion of track 82 engaged by the roller 81 will form substantially an isosceles triangle having its base line uppermost and its vertex, which illustratively defines an obtuse angle, pointed downwardly.

Inasmuch as the portion 41g (Fig. 8) of the gasket 41 of panel B near the outer edge 47 of panel B adjacent the abutment 51, is against the rail 26 when the panels are in the closed position shown in Fig. 1, if the panels should be moved toward the open position shown in Fig. 2, without first moving such portion 41g away from the rail 26, as the panel B moves toward open position, portion 41g would rub against the rail 26 with resultant rapidity of wear that would cause the gasket to break down at the point of friction so that no dependable seal would be provided and leakage would occur.

To eliminate such wear, means are provided to move the portion 41g of the gasket 41 away from the rail 26 immediately prior to movement of the panel B to open position and immediately prior to movement of the panel B to finally closed position.

Such means desirably comprises a camming or abutment member 91 rigidly affixed to each of the tracks 82 and rising therefrom, each of said abutments 91 having an inclined surface 92 on which the associated roller 81 may ride in the manner to be described.

The panel C is desirably moved from closed position shown in Fig. 2 to open position shown in Fig. 3 by means of hydraulic unit 93 pivotally connected at one end as at 94 to a beam 95. The unit has a piston 96 slidable therein with a piston rod 97 connected thereto at one end and pivoted at its other end as at 98 to the end wall of the coaming 23.

To open the hatchway, suitable valves controlling a source of fluid under pressure may be actuated so that such fluid under pressure will be applied to the ports 76 of the hydraulic units 67, 68 in direction to move the pistons 78 thereof toward each other. As a result, an upward component of force will be exerted against the hinge pin 65 and the two panels A and B will move upwardly from their normal horizontal position.

As the panel A is pivoted to the deck of the ship, as at 32, the initial upward movement of the panels will cause the hinge pin 65 to rise in an arcuate path as shown in Fig. 11a, away from the pivot connection 32. This path of movement of the hinge pin 65 will cause the panel B to be moved slightly to the left, the resilience of the abutting gasket portions 41d, 41f shown in Fig. 4 permitting such movement even when the panel C is in the closed position shown.

Such movement of panel B, which is due to the relation between the hinge point 65, pivot point 32 and the portion of track 82 engaged by roller 81 when the panels are in closed position, will cause the rollers 81 to ride up the inclined surfaces 92 of the abutment 91. This upward movement of the rollers will cause the outer edge 47 of the panel B to be lifted, thereby moving portion 41g (Fig. 8) of gasket 41 away from the rail 26 and the lower edge of the portion 41c of the gasket will ride along the surface of abutment 51 which is desirably at the same inclination as that of the surface 92 of the abutment 91.

With continued upward movement of the hinge pin 65 under the action of the hydraulic units 67, 68, the panels A and B will then tend to fold more and more toward each other. As this occurs, the rollers 81 of the panel B will start to ride down the inclined surface 92 of the abutment 91. However, at such time the panels A and B are inclined from the horizontal and as the peripheries of rollers 81 extend sufficiently beyond the edge 47 of the panel B (Fig. 7) to insure that when the panel B is inclined from the horizontal, the portion 41g and the lower end of portion 41c of gasket 41 will no longer engage the rail or the abutment 51 respectively, continued movement of the panels to the vertical position shown in Fig. 3 will occur without any rubbing of the gasket 41 against such rail 26 or abutment 51.

Similarly, when the panels A and B are moved from the open position shown in Fig. 3 to the closed position shown in Fig. 2, just before the panels reach the closed position, hinge pin 65 between the two panels will have moved back to the plane of the line shown in Fig. 11a. Consequently, as previously described, the panel B will have been moved to the left and the rollers 81 on panel B will have ridden up the inclined surfaces of the abutments 91 retaining the portion 41g of gasket 41 away from the rail 26. With continued closing movement of the panels, toward the position shown in Fig. 11, the rollers 81 will then ride down the inclined surfaces 92 of abutments 81 and when the rollers reach the tracks 82 the gasket 41 will be pressed against the rail 26 to provide a dependable seal without any rubbing action that would cause breakdown of the gasket.

With the construction above described, it is apparent that the panels, when in closed position will dependably close the hatch opening and the gaskets 41 will effect a watertight seal and by reason of the abutment member 91 and the arrangement of the hinge pin 65, the pivot 32 and the portion of tracks 82 engaged by rollers 81 when the panels are in closed position, there will be no likelihood of rubbing of the gasket during opening or closing operations with attendant breakdown and failure of the unit and leakage past such seals.

Although the hatch cover assembly above described has been shown with one pair of pivotally connected panels A and B and one individually hinged panel C, it is of course to be understood that such individually hinged panel could be replaced by a pair of pivotally connected panels similar to panels A and B. In such case rollers and abutment members would be provided similar to those associated with panel B to effect breaking of the seal to prevent rubbing upon opening and closing of such additional pair of panels.

As this modification would be apparent to one skilled in the art, in view of the disclosure herein, no further description thereof will be given.

The embodiment shown in Fig. 12 is substantially identical to the embodiment shown in Figs. 1 to 11 and corresponding parts have the same reference numerals primed.

In this embodiment the abutment member 91' is an upstanding arm 101 rising from the track 82' and having a roller 102 near its upper end and the end 25' of the panel B' has an arm 103 with an inclined surface 104 adapted to engage such roller 102. In addition, a roller 81' is carried at the end of an arm 105 affixed to each of the ends 25' of the panel B' and extending outwardly beyond the outer edge 47' thereof, said roller 81' riding on the track 82'.

The operation of the embodiment shown in Fig. 12 is almost identical to that of the embodiment shown in Figs. 1 to 11. Thus, when the hinged panels are initially raised, the panel B' will move to the left and the inclined surface 104 of arm 103 will ride up the roller 102. When this occurs, the portion 41'g of the gasket 41' adjacent edge 47' will move away from the sealing rail (not shown) to break the seal. With continued upward movement of the panels which causes panel B' to move to the right, the inclined surface 104 of arm 103 will ride down the roller 102, but at this time the angle of inclination of panel B' is such that the portion 41'g of gasket 41' will be clear of the rail so there will be no rubbing action with continued movement of the panels to vertical open position. Similarly, as the panels are moved to closed position and the inclined surface 104 of arm 103 rides up the roller 102, the portion 41'g of gasket 41' will be retained away from the rail and only immediately prior to the final movement of the panels to closed position will such portion 41'g of gasket 41' engage the rail to provide a dependable seal without rubbing of such gasket.

In the embodiment shown in Figs. 13 through 16 inclusive, two pairs of hatch covers X and Y are provided although it is to be understood that more than two pairs could be used. The two pairs of hatch covers, each has two panels X–1, X–2, Y–1, Y–2 respectively, the panel X–1 being pivotally connected as at 121 to the adjacent end of the hatchway. The adjacent lower edges 122 of the panels of each pair are connected by means of hinges 123 and the adjacent upper edges of the panels X–2 and Y–2 are also connected as by hinges 124. The panels are provided with gaskets 125 which coact with a rail 126 and with each other in a manner similar to that previously described with respect to gaskets 41 and as shown in Figs. 5 and 9, for example. The hydraulic units 127, 128 and reaction plate 129 associated with the hinges 123 are identical to those shown in Figs. 1 to 3 and hence will not be further described.

Affixed to the end 130 of panel Y–2 and extending beyond the edge 131 thereof is an arm 132 which carries a roller 133 at its free end which illustratively has its periphery slightly spaced from a track 134 affixed to the coaming 135.

The outer edge 136 of panel Y–1 has a laterally extending stud shaft 137 near the lower edge thereof which mounts a roller 138, which rides on track 134. When the panels are in closed position shown, the roller 138 rests in a depression 139 in the track 134 to insure that the gasket 125 will press snugly against the rail 126 to provide a dependable seal. Aligned with the roller 138 and rigidly affixed to the track 134 is an abutment member 141 which has an inclined surface on which the roller 138 is adapted to roll in operation of the unit. The abutment member 141 is positioned at the end of the hatch opening remote from the pivotal mount 121 of the hatch cover assembly and the lower edge of the inclined surface of the abutment member 141 is preferably at the adjacent end of the depression 139 and aligned therewith.

In the operation of the equipment shown in Figs. 13 to 16 inclusive, the hydraulic units 127 and 128 associated with panels Y–1, Y–2 are first actuated. By reason of the arrangement of the hinge 124, the hinge 123 between the two panels Y–1 and Y–2 and the portion of tracks 134 engaged by rollers 138 when the panels are in closed position, as the panels Y–1 and Y–2 start to fold together about their hinge 123, panel Y–1 will first move slightly to the right so that the roller 138 will ride out of the depression 139 and up the inclined surface of abutment 141 to break the seal at the region adjacent the outer edge 136 of panel Y–1 in the manner described with respect to the embodiment shown in Figs. 1 to 11. With further upward folding movement of the panels Y–1 and Y–2, the roller 133 on arm 132 will move downwardly until it engages the track 134 as is shown in Fig. 16. At such time the folding movement of the panels Y–1 and Y–2 will cause the edges 131 and 142 of panels Y–2 and X–2 adjacent hinge 124 to be lifted, thereby moving the portions of gaskets 125 of panels X–2 and Y–2 adjacent hinge 124 away from the rail 126. Such continued upward movement of the panels Y–1 and Y–2 will also cause the roller 138 to ride down abutment 141. However, at such time the panels Y–1 and Y–2 are inclined from the horizontal and as the peripheries of rollers 133 and 138 extend sufficiently beyond the edges 131 and 136 of said panels to insure that when said panels are inclined from the horizontal, the portions of the gaskets 125 adjacent the edges 131 and 136 of said panels will no longer engage the rail 126, continued movement of the panels to the vertical position shown in Fig. 14 will occur without any rubbing of the gasket 125 against such rail 126.

After the panels Y–1 and Y–2 have moved to substantially vertical position and hydraulic units associated with panels X–1 and X–2 may be actuated and these sections will also fold to substantially vertical position dragging the vertical pair of panels Y–1 and Y–2 along until they are adjacent the hinge 121 as shown in Fig. 14.

It is apparent that at the beginning of the opening operation of the embodiment shown in Figs. 13 to 16, the seal will be broken and such seal will remain broken throughout such opening operation. In the movement of the covers to closed position, the hydraulic units are actuated in reverse order to that previously described. Thus, the hydraulic units associated with the panels X–1 and X–2 are first actuated to move these panels to the position shown in Fig. 16 except that the panels Y–1 and Y–2 will be in substantially vertical position. As the rollers 133 will retain the portion of gaskets 125 adjacent edge 141 and 131 of panels X–2 and Y–2 away from the rail 126 no rubbing of gaskets 125 will occur. Thereupon, the panels Y–1 and Y–2 are moved to closed position and as this occurs the pivoting of such panels will cause the edges 131 and 142 of panels Y–2 and X–2 to move downwardly until the ends of such panels are in engagement with the rail 126. As such downward movement occurs the rollers 138 will first ride up the inclined surface 141 of abutment and then down such abutment as previously described and when the rollers 138 are finally seated in the depressions 139 the entire hatch cover will be completely closed with the gaskets 125 in sealing position.

The embodiment shown in Figs. 17 and 18 is substantially identical to that shown in Figs. 13 through 16 and corresponding parts have the same reference numerals primed. In such embodiment either pair of panels may be initially operated and to this end an additional roller 151 is rotatably mounted on a stud shaft 152 extending laterally outward from each end of panel X'–2 adjacent the edge 142' thereof as shown in Fig. 18. The roller 151 rides on a track 153 positioned inwardly of the track 134' and extending toward the pivot mount 121' of panel X'–1 and in the closed position shown in Fig. 17 the roller 151 is seated in a depression 154 in the track 153. An abutment member 155 having an inclined surface is affixed to the track 153 adjacent to and on the side of the depression 154 remote from the pivot mount 121'.

In the operation of the embodiment shown in Figs. 17 and 18, if the hydraulic units associated with the panels Y'–1 and Y'–2 are first actuated, the panel Y'–1 will move to the right in the same manner as described with respect to the embodiment shown in Figs. 13 to 16 and the roller 138' will ride out of the depression 139' in track 134' and up the inclined surface of abutment 141' to break the seal at such point. Thereafter, with continued folding of the panels Y–2 and Y–1 to the vertical position, the roller 133' will press against the track 134' as the panel Y–2 is inclined, to lift the portions of the gaskets of panels Y'–2 and X'–2 adjacent hinge 124' away from the sealing rail (not shown) to break the seals effected by such gaskets. The panels X'–1 and X'–2 may then be opened in the same manner as the panels X–1 and X–2 of the embodiment of Figs. 13 to 16, previously described.

With all the panels in the closed position shown, the panels X'–1 and X'–2 may be initially actuated and this will occur also without rubbing of the gasket. Thus, when the hydraulic units associated with panels X'–1 and X'–2 are operated, the panel X'–2 will move to the right so that the rollers 151 will ride out of the depressions 154 in tracks 153 and up the inclined surfaces of abutments 155 thereby breaking the seal of the gaskets adjacent hinge 124'. With continued upward folding of panels X'–1 and X'–2, the rollers 151 will ride down the inclined surfaces of the abutments 155. However, by reason of the inclination of the panels X'–1, X'–2, the rollers 151 which extend beyond the edge 142' of panel X'-2 will retain the gasket of panel X'-2 away from the sealing rail to prevent rubbing. In addition, the inclination of panel X'-2 will also cause the edge 131' of panel X'-2 adjacent hinge 124' to be lifted to space the adjacent portion of its gasket from the sealing rail. Furthermore, as panels Y'-2 and Y'-1 are dragged to the left with such opening action of panels X'-1 and X'-2, as the rollers 133' will move out of the associated depressions 139' to raise the edge 136' of panel Y'-1, the associated portion of the gasket on panels Y'-1 will be spaced from the sealing rail to prevent rubbing action thereof during such dragging movement. The panels Y'-1 and Y'-2 may then be opened in the same manner as the panels Y-1 and Y-2 of the embodiment of Figs. 13 to 16 previously described.

With the equipment above described, the hatch cover panels may be moved from closed to open position and vice versa without likelihood of rubbing of the gaskets during such movement which would cause rapid breakdown thereof and leakage past such seals into the hatchways. Such assurance of no undue friction or rubbing of the gaskets during opening and closing operation, is accomplished without the need for additional moving elements or sources of power other than that required to operate the hatch covers themselves, i.e., the hydraulic units which serve to move the covers from open to closed position and vice versa.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A cover assembly for a hatchway, comprising a pair of panels adapted to extend over said hatchway, said panels lying in side by side relation in substantially a horizontal plane when in closed position, means pivotally mounting an edge of one of said panels, means pivotally connecting the adjacent edges of said panels for folding movement thereof between closed and open position, a roller at each end of the opposite edge of the other panel, the peripheries of said rollers extending beyond said opposite edge, a track positioned on each side of said hatchway on which said rollers ride to guide the opposite edge of the other of said panels in substantially a horizontal plane, a gasket mounted on the periphery of each of said panels, a sealing rail on each side of the hatchway adapted to be engaged by said gaskets, said pivotal connection between adjacent edges of said panels lying below a plane extending between said pivotal mount and the portion of said tracks on which said rollers rest when said panels are in closed position, a camming member rigidly affixed on each side of the hatchway on the side of the rollers remote from the pivotal connection and in the path of movement of an associated roller, each of said camming members having an inclined surface on which an associated roller rides upon initial pivotal movement of said other panel from closed position to move the adjacent portion of said gasket away from the sealing rail.

2. The combination set forth in claim 1 in which means are carried by said panels to effect movement thereof about said pivotal connection, said means comprising a pair of hydraulic units mounted respectively in said panels in opposed relation, each of said units having a reciprocable plunger, a reaction member for said pair of panels, a pivotal mount for said reaction member, one end of each of said plungers being connected to opposed sides respectively of said reaction member, whereby upon movement of said plungers toward each other the panels will be moved about their pivotal connection.

3. The combination set forth in claim 1 in which a sealing abutment member is affixed to said sealing rail and a portion of the gasket on said other panel adjacent the guided edge thereof is adapted to engage said abutment member when said panels are in closed position.

4. The combination set forth in claim 1 in which a sealing abutment member is affixed to said sealing rail, a portion of the gasket on said other panel adjacent the guided edge thereof is adapted to engage said abutment member when said panels are in closed position and the portion of the sealing abutment member engaged by said gasket portion has an inclination substantially the same as the inclination of the camming members on which the rollers ride.

5. The combination set forth in claim 1 in which the means pivotally mounting an edge of one of said panels is fixed with respect to one end of the hatchway, an additional pivotally mounted panel is provided adapted to lie in side by side relation with the other panel of said pair when said panels are in closed position over said hatchway, a gasket is mounted on the periphery of said additional panel adapted to engage said sealing rail, the gaskets on said additional panel and said other panel having portions adapted to engage when said panels are in closed position to provide a seal.

6. The combination set forth in claim 5 in which a portion of the gasket on said other panel and said additional panel extends along each end of the associated panel to engage said rail, the guided edge of said other panel and the adjacent edge of said additional panel each has a portion of its associated gasket extending the length thereof above the plane of the gasket portion adapted to engage said rail and an additional gasket portion at each end of said other panel and said added panel adjacent said guided edge and said adjacent edge respectively, joins the ends of said first two portions, said additional gasket portions on said other panel and said additional panel being inclined away from said pivotal mount and adapted to engage when said panels are in closed position.

7. The combination set forth in claim 6 in which an abutment member is affixed to said sealing rail, and the lower end of said additional gasket portion of said other panel is adapted to engage said abutment member when said panels are in closed position.

8. A cover assembly for a hatchway, comprising a plurality of pairs of panels adapted to extend over said hatchway, said panels lying in side by side relation in substantially a horizontal plane when in closed position, means pivotally mounting the outer edge of one of the panels of one of said pairs of panels at one end of the hatchway, means pivotally connecting adjacent edges of said panels for folding movement thereof between closed and open position, a roller at each end of the panel remote from the pivotally mounted panel, the peripheries of said rollers extending beyond the outer edge of the associated panel, a track positioned on each side of the hatchway on which said rollers ride to guide the outer edge of said roller mounting panel in substantially a horizontal plane, a roller at each end of the panel pivotally connected to the roller mounting panel, the peripheries of said second rollers extending beyond the edge of the associated panel and adapted to ride on said tracks, a gasket mounted on the periphery of each of said panels, a sealing rail on each side of the hatchway adapted to be engaged by said gaskets, said pivotal connection between adjacent edges of each pair of panels lying respectively below a plane extending between said pivotal mount and the portion of said tracks adjacent said second pair of rollers when said panels are in closed position and below a plane extending between the pivotal connection between the pairs of panels and the portion of said tracks adjacent the first pair of rollers when said panels are in closed position, a camming member rigidly affixed on each side of the hatchway on the side of the first pair of rollers remote from the pivotal mount, and in the path of movement of an associated roller, each of said camming members having an inclined surface on which an associated roller rides upon initial pivotal movement of the associated pair of panels from closed position to move the adjacent portion of said gasket away from the sealing rail.

9. The combination set forth in claim 8 in which each of said tracks has a depression therein adjacent the associated camming member in which the associated roller seats when the panels are in closed position.

10. The combination set forth in claim 8 in which an arm is affixed to each end of the panel pivotally connected to the roller mounting panel and extends beyond the adjacent edge of the panel of the adjacent pair of panels pivotally connected thereto and the second rollers are mounted respectively on the free ends of each of said arms.

11. The combination set forth in claim 8 in which said second rollers are normally spaced from said tracks when the panels are in closed position.

12. The combination set forth in claim 8 in which an additional roller is mounted at each end of the panel adjacent the panel mounting the second rollers, said additional rollers being positioned inwardly of said second rollers with the peripheries of said additional rollers extending beyond the edge of the associated panel adjacent the panel mounting said second rollers, an additional track positioned on each side of the hatchway inwardly of the first track, supports said additional rollers, and an additional camming member having an inclined surface is mounted on each of said additional tracks on the side of said additional rollers remote from the pivotal mount.

13. The combination set forth in claim 12 in which each of said additional tracks has a depression therein adjacent the associated camming member in which the associated roller seats when the panels are in closed position.

14. The combination set forth in claim 12 in which said first pair of tracks and said additional tracks have depressions therein adjacent the associated camming members in which the associated roller seats when the panels are in closed position.

15. A cover assembly for a hatchway, comprising a pair of panels adapted to extend over such hatchway, said panels lying in side by side relation in substantially a horizontal plane when in closed position, means pivotally mounting an edge of one of said panels, means pivotally connecting the adjacent edges of said panels for folding movement thereof between closed and open position, means to guide the opposite edge of the other of said panels in substantially a horizontal plane, a gasket mounted on the periphery of each of said panels, a sealing rail on each side of the hatchway adapted to be engaged by said gaskets, said pivotal connection, said pivotal mount and said guide means being positioned to effect movement of said other panel away from said pivotal mount immediately prior to initial folding movement of said panels from closed position, a camming member rigidly affixed at one side of said hatchway and means carried by said other panel adjacent the guided edge thereof adapted to engage said camming member upon initial movement of said other panel from closed position away from said pivotal mount to effect raising of said guided edge, thereby to move the adjacent portion of said gasket away from the sealing rail.

16. A cover assembly for a hatchway, comprising a pair of panels adapted to extend over such hatchway, said panels lying in side by side relation in substantially a horizontal plane when in closed position, means pivotally mounting an edge of one of said panels, means pivotally connecting the adjacent edges of said panels for folding movement thereof between closed and open position, means to guide the opposite edge of the other of said panels in substantially a horizontal plane, a gasket mounted on the periphery of each of said panels, a sealing rail on each side of the hatchway adapted to be engaged by said gaskets, said pivotal connection, said pivotal mount and said guide means being positioned to effect movement of said other panel away from said pivotal mount immediately prior to initial folding movement of said panels from closed position, an upstanding member rigidly affixed on the side of the hatchway adjacent the guided edge of said other panel when the latter is in closed position and complementary means on said upstanding member and said other panel to effect raising of said guided edge upon initial movement of said other panel from closed position away from said pivotal mount, thereby to move the adjacent portion of said gasket away from the sealing rail.

17. The combination set forth in claim 16 in which said complementary means comprises a roller mounted on said upstanding member and an inclined member on said other panel adapted to engage said roller to effect the raising of said guided edge upon initial movement of said other panel from closed position away from said pivotal mount.

18. A cover assembly for a hatchway, comprising a pair of panels adapted to extend over such hatchway, said panels lying in side by side relation in substantially a horizontal plane when in closed position, means pivotally mounting an edge of one of said panels, means pivotally connecting the adjacent edges of said panels for folding movement thereof between closed and open position, means to guide the opposite edge of the other of said panels in substantially a horizontal plane, a roller at each end of the guided edge of said other panel, the peripheries of said rollers extending beyond said guided edge, said guide means comprises a track positioned on each side of the hatchway on which said rollers ride, a gasket mounted on the periphery of each of said panels, a sealing rail on each side of the hatchway adapted to be engaged by said gaskets, said pivotal connection, said pivotal mount and said guide means being positioned to effect movement of said other panel away from said pivotal mount immediately prior to initial folding movement of said panels from closed position, a camming member rigidly affixed on the side of the hatchway in the path of movement of an associated roller and positioned to be engaged by said roller upon initial movement of said other panel from closed position away from said pivotal mount to effect the raising of said guided edge, thereby to move the adjacent portion of said gasket away from the sealing rail.

19. The combination set forth in claim 18 in which said camming member has an inclined surface positioned to be engaged by the associated roller upon initial movement of said other panel from closed position away from said pivotal mount.

20. The combination set forth in claim 18 in which each of said tracks has a depression in which the associated roller may seat when said panels are in closed position.

References Cited in the file of this patent
UNITED STATES PATENTS

| | | |
|---|---|---|
| 2,256,087 | Hay | Sept. 16, 1941 |
| 2,726,623 | Jernstrom | Dec. 13, 1955 |